(12) United States Patent
Aizawa

(10) Patent No.: US 10,029,176 B2
(45) Date of Patent: Jul. 24, 2018

(54) DATA PROCESSING APPARATUS AND METHOD OF CONTROLLING DISPLAY

(71) Applicant: KOEI TECMO GAMES CO., LTD., Kanagawa (JP)

(72) Inventor: Yosuke Aizawa, Kanagawa (JP)

(73) Assignee: KOEI TECMO GAMES CO., LTD., Kanagawa (JP)

( * ) Notice: Subject to any disclaimer, the term of this patent is extended or adjusted under 35 U.S.C. 154(b) by 0 days.

(21) Appl. No.: 15/262,065

(22) Filed: Sep. 12, 2016

(65) Prior Publication Data

US 2017/0076486 A1 Mar. 16, 2017

(30) Foreign Application Priority Data

Sep. 14, 2015 (JP) ................................. 2015-181213

(51) Int. Cl.
| | |
|---|---|
| *G06T 19/00* | (2011.01) |
| *A63F 13/25* | (2014.01) |
| *G06F 3/01* | (2006.01) |
| *A63F 13/211* | (2014.01) |
| *G06F 1/16* | (2006.01) |

(52) U.S. Cl.
CPC ............ *A63F 13/25* (2014.09); *A63F 13/211* (2014.09); *G06F 1/163* (2013.01); *G06F 3/011* (2013.01); *G06F 3/012* (2013.01); *G06F 3/013* (2013.01); *G06T 19/006* (2013.01); *A63F 2300/8082* (2013.01)

(58) Field of Classification Search
CPC combination set(s) only.
See application file for complete search history.

(56) References Cited

U.S. PATENT DOCUMENTS

| | | | |
|---|---|---|---|
| 2009/0202114 A1* | 8/2009 | Morin | A63F 13/12 382/118 |
| 2013/0050258 A1* | 2/2013 | Liu | G02B 27/017 345/633 |
| 2015/0177518 A1* | 6/2015 | Wong | G02B 27/017 345/633 |
| 2015/0269780 A1* | 9/2015 | Herman | G06T 13/00 345/633 |

FOREIGN PATENT DOCUMENTS

JP 2012-212237 11/2012

\* cited by examiner

*Primary Examiner* — Ryan M Gray
(74) *Attorney, Agent, or Firm* — IPUSA, PLLC

(57) ABSTRACT

A data processing apparatus that controls a screen displayed by a body-mounted data display device, includes a measurement unit that measures a viewing direction or a focal length of a user, based on a motion data of a head and eyes of the user who wears the data display device; an object display control unit that controls a viewing direction or a focal length of an object that moves in a virtual space displayed in the screen by an operation of the user to correspond to the viewing direction or the focal length of the user obtained from the measurement unit, respectively; and a content generation unit that generates a content to be displayed in a screen, in which the motion of the object obtained from the object display control unit is displayed, that is displayed by the data display device.

12 Claims, 6 Drawing Sheets

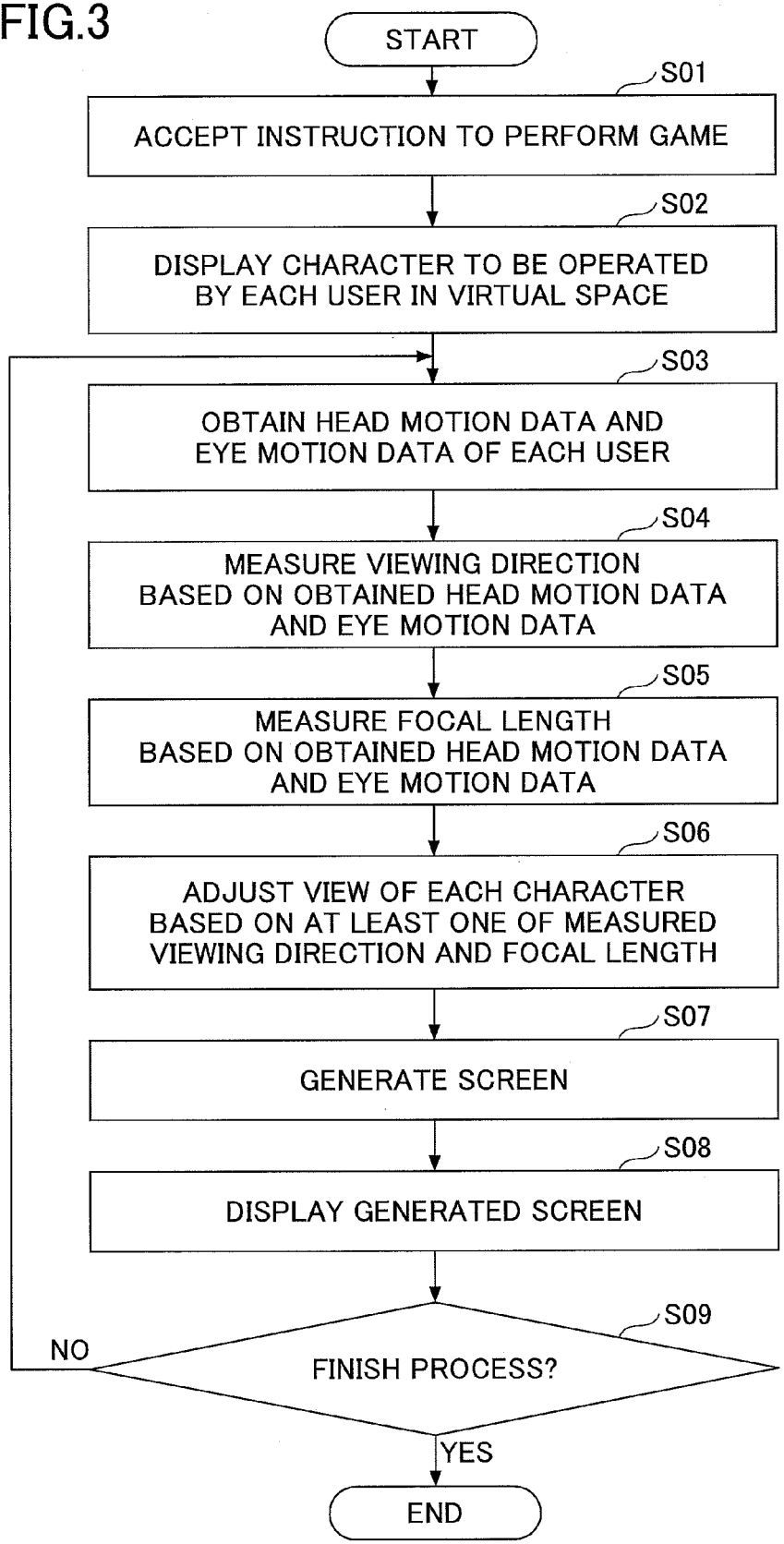

DATA PROCESSING APPARATUS AND METHOD OF CONTROLLING DISPLAY

CROSS-REFERENCE TO RELATED APPLICATION

The present application is based on and claims the benefit of priority of Japanese Priority Application No. 2015-181213 filed on Sep. 14, 2015, the entire contents of which are hereby incorporated by reference.

BACKGROUND OF THE INVENTION

The present invention relates to a data processing apparatus and a method of controlling display.

DESCRIPTION OF THE RELATED ART

Conventionally, a body-mounted data display device (a wearable data display device) such as a Head Mounted Display (HMD), a Face Mounted Display (FMD) or the like has been provided. By wearing such a data display device, an image can be displayed in the entirety of the eyesight of a user by an optical magnification system, or the user can feel as if he/she is in a virtual space by a Virtual Reality (VR) technique.

Further, recently, a technique has been developed in which such a data display device is equipped in a game device or the like in order to improve entertainment by giving a feeling to a player that the player joins a game in a virtual space, and by improving immersion in the game. For example, a motion detection unit detects a motion of a user (player) as motion detection data. Then, motion input data, that is used for generating an image of a character to be operated, is calculated based on the motion detection data in addition to a movement by a controller. The motion input data is applied to at least one of the controls of the motion of the character and a virtual camera (Patent Document 1, for example).

However, according to the above described conventional method, a motion of a head of the user is detected by a camera, and a virtual space image or the entire body of the character is moved based on the detected result. Thus, a detailed motion of the character such as a direction of a face or the movement of eyes is not controlled in accordance with a detailed motion of the user such as a direction of a face or the movement of eyes. Further, there is no method of notifying such a detailed motion of the character in the virtual space such as the direction of the face or the movement of the eyes to another user who operates another character that exists in the same virtual space. Thus, the users cannot communicate with each other by the movements of the heads, or the views so that the users cannot experience a more realistic world.

PATENT DOCUMENT

[Patent Document 1] Japanese Laid-open Patent Publication No. 2012-212237

SUMMARY OF THE INVENTION

The present invention is made in light of the above problems, and provides a technique to appropriately control a motion of a character in a virtual space in accordance with an actual motion of a user.

According to an embodiment, there is provided a data processing apparatus that controls a screen displayed by a body-mounted data display device, including: a measurement unit that measures a viewing direction or a focal length of a user, based on a motion data of a head and eyes of the user who wears the data display device; an object display control unit that controls a viewing direction or a focal length of an object that moves in a virtual space displayed in the screen by an operation of the user to correspond to the viewing direction or the focal length of the user obtained from the measurement unit, respectively; and a content generation unit that generates a content to be displayed in a screen, in which the motion of the object obtained from the object display control unit is displayed, that is displayed by the data display device.

BRIEF DESCRIPTION OF THE DRAWINGS

Other objects, features and advantages of the present invention will become more apparent from the following detailed description when read in conjunction with the accompanying drawings.

FIG. 3 is a flowchart illustrating an example of a display control process of the first embodiment;

DETAILED DESCRIPTION OF THE PREFERRED EMBODIMENTS

Figure 1:
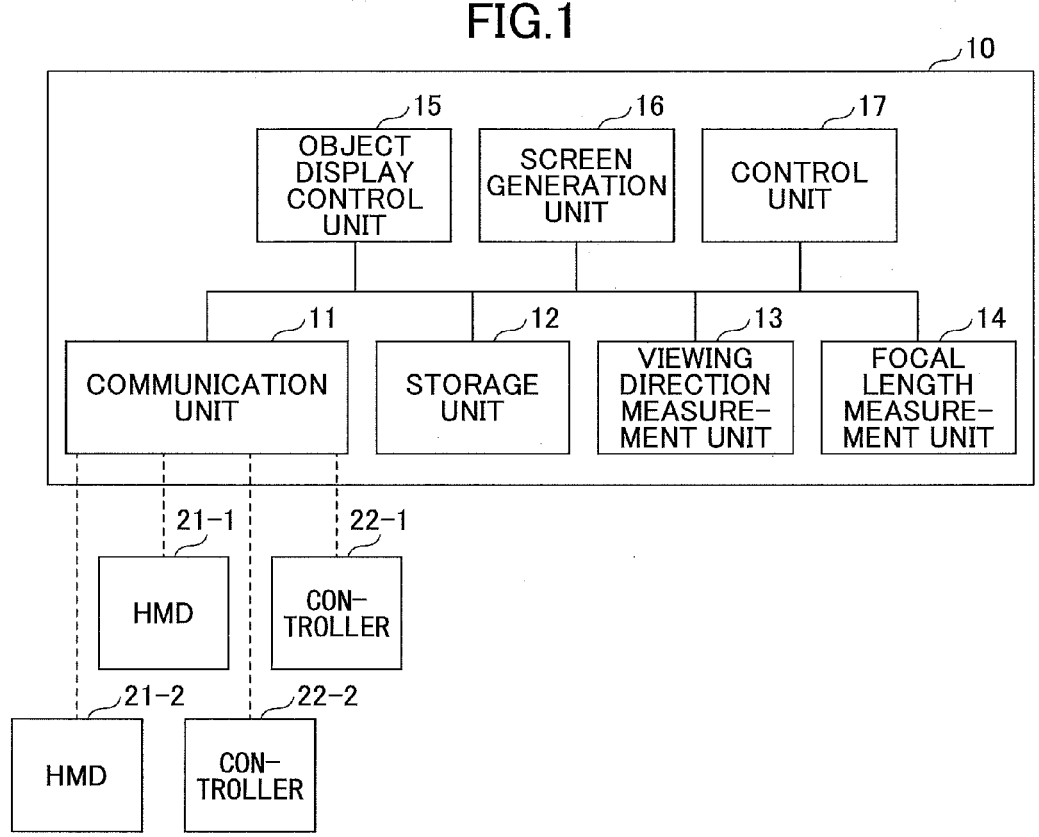
FIG. 1 is a block diagram illustrating an example of a functional structure of a data processing apparatus of a first embodiment.

The invention will be described herein with reference to illustrative embodiments. Those skilled in the art will recognize that many alternative embodiments can be accomplished using the teachings of the present invention and that the invention is not limited to the embodiments illustrated for explanatory purposes.

It is to be noted that, in the explanation of the drawings, the same components are given the same reference numerals, and explanations are not repeated.

In the following, an example is described as an embodiment in which a plurality of characters operated by a plurality of users (players), respectively, exist in a same virtual space provided by a predetermined game program (as an example of a content) or the like. However, the virtual space is not limited to one provided by the game program, and the embodiment may be applied to a case in which only a single character exists in a same virtual space.

First Embodiment (Example of Functional Structure of Data Processing Apparatus)

FIG. 1 is a block diagram illustrating an example of a functional structure of a data processing apparatus 10 of the first embodiment. The data processing apparatus 10 illustrated in FIG. 1 includes a communication unit 11, a storage unit 12, a viewing direction measurement unit 13, a focal length measurement unit 14, an object display control unit 15, a screen generation unit 16 and a control unit 17. The data processing apparatus 10 is an electronic device such as a game device, a PC (Personal Computer), a tablet terminal or the like, but not limited so.

The communication unit 11 is connected to an external device by a wired or wireless network, and sends and receives data. As illustrated in FIG. 1, HMDs 21-1 and 21-2 (hereinafter, simply referred to as a "HMD 21" as well), and a plurality of controllers 22-1 and 22-2 (hereinafter, simply referred to as a "controller 22" as well), which are an example of an operation device (operation unit), are connected to the communication unit 11. This means that the plurality of HMDs 21 and the plurality of controllers 22 are connected to the data processing apparatus 10 of the first embodiment, and by allocating the plurality of HMDs 21 and the plurality of controllers 22 to a plurality of users, respectively, so-called "2 player games (2P play)", "3 player games (3P play)" or the like are actualized.

The number of each of the HMDs 21 and the controllers 22 connected to the communication unit 11 is not limited as long as it is one or more. Each of the users wear one of the HMDs 21 at his/her head, and inputs various instructions, operations and the like using one of the controllers 22 or the like.

The HMD 21 is a display device (a body-mounted data display device) having a shape wearable at a head of a user such as glasses, goggles, a helmet, for example. When the user wears the HMD 21 at his/her head, screens are set in front of eyes of the user, respectively. The HMD 21 may display images that are slightly different from each other at bilateral displays, not just displaying an image, so that the user can view a third-dimensional image. Further, the HMD 21 may vary the screens in accordance with the movement of the head of the user so that eyesight in the virtual space can be provided.

Further, the HMD 21 may detect information regarding position of the head, direction of the face and acceleration (including velocity) of the head every time unit, and send the information to the data processing apparatus 10. Further, the HMD 21 may be provided with an inward direction camera (imaging unit) or the like to detect positions of the eyes. Then, the HMD 21 may detect a viewpoint (a fixation point) from the position and the direction of the eyes (irises) of the user every time unit, and send the information to the data processing apparatus 10.

Further, the HMD 21 may include a sensor that detects sweat rate of the user, a body temperature sensor that detects body temperature of the user, or a heart rate detection sensor that detects heart rate of the user, and send at least one of the information obtained from these sensors to the data processing apparatus 10.

The controller 22 sets an image to be displayed on the HMD 21, and performs various settings for a display control process of the embodiment. When the data processing apparatus 10 is a game device, the controller 22 controls the start and end of the game, selection of items, motion of the game and the like.

The communication unit 11 is connected to an external device via a communication network such as the INTERNET, LAN (Local Area Network) or the like so that data can be sent and received, for example. The communication unit 11 is capable of downloading a game program from the external device, or receiving and sending various data regarding a display control program of the embodiment.

The storage unit 12 stores various data that are necessary for the display control process of the embodiment. For example, the storage unit 12 stores various setting data for performing the game program or the like of the embodiment, information of the user such as the position of the head, the direction of the face, the viewpoint or the like obtained from the HMD 21 or the like. However, the contents stored in the storage unit 12 are not limited so.

The viewing direction measurement unit 13 (an example of a measurement unit) measures a viewing direction (looking direction) toward the virtual space displayed in the screen of the HMD 21 based on the information obtained from the HMD 21 every time unit such as the motion of the head or the eyes of the user or the like.

For example, the viewing direction measurement unit 13 obtains position, attitude (direction), acceleration or the like of the head (face) of the user from the position sensor, the attitude sensor, the acceleration sensor or the like of the HMD 21. Then, the viewing direction measurement unit 13 obtains information at the moment such as where the position of the head or the direction of the face of the user exists, which direction and which velocity the head of the user is moving or the like as motion data (head motion data) that is associated with the virtual space displayed at each of the HMDs 21 at the moment.

Further, the viewing direction measurement unit 13 analyzes an image near the eyes of the user taken by the inward direction camera (imaging unit) or the like provided in each of the HMDs 21, and obtains viewpoint (fixation point) data (eye motion data) obtained from the position, the direction, the size or the like of the irises as data that is associated with the virtual space. The viewing direction measurement unit 13 measures the viewing direction based on the above described head motion data and the eye motion data. The viewing direction is information where each of the users views in the virtual space displayed in the screen of the HMD 21, for example. However, this is not limited so, and the viewing direction may be a viewing direction at the moment that is not associated with a virtual space, for example.

The focal length measurement unit 14 (an example of a measurement unit) measures the focal length toward the virtual space displayed in the screen of each of the HMDs 21 based on the viewpoint (fixation point) obtained from the respective HMD 21. For example, the focal length measurement unit 14 measures the focal length in the virtual space based on the head motion data, the eye motion data or the like obtained from the HMD 21. For example, when there exists an object such as a building or the like beyond the direction of the head and the position of the irises (beyond the user's view), the distance from the character to be operated to the building is the focal length. Further, when there exists another character beyond the user's view, the distance from the character to be operated to the other character is the focal length.

Here, the focal length may be a numerical value such as the focal length is 3 m, 15 m or the like, for example. Alternatively, the focal length may be rough distance data such as "viewing a near site (short distance)", "viewing a far site (long distance)" or the like. Further, when the direction of the face is more upward than a standard position, the focal length measurement unit 14 may determine that the possibility that the user is viewing a far site is high and measure the focal length as "long distance".

The object display control unit 15 adjusts the direction of the face and the viewing direction of the object to be operated that exists in the virtual space displayed in the screen of the HMD 21 based on various information obtained from at least one of the viewing direction measurement unit 13 and the focal length measurement unit 14. The object is a character, an avatar or the like, but not limited so. Further, the object is not limited to a character or the like of a human, and may be an object capable of moving in the virtual space such as an animal, a fish, a flower, a bug, a ghost, a monster, a robot or the like, for example.

The object display control unit 15 detects information regarding a shift of at least one of the viewing direction and the focal point direction obtained by the viewing direction measurement unit 13 and the focal length measurement unit 14, respectively, with respect to the current direction of the head (face) and the center of the viewpoint of each of the characters (an example of an object) operated by the respective user. Then, the object display control unit 15 performs display control in which at least one of information including the direction of the face, the view and the focal point of the character is reflected for compensating the shift.

The object display control unit 15 may not perform display control of each of the characters based on the focal length obtained by the focal length measurement unit 14. In such a case, the focal length measurement unit 14 may be omitted from the data processing apparatus 10.

The screen generation unit 16 serves as a content generation unit to generate contents to be displayed in the screen of the HMD 21, for example. For example, the screen generation unit 16 displays a virtual space provided by the game program instructed by the user to be performed, and generates an image in which the characters operated by the users, respectively, are synthesized on the virtual space. The direction of the head (face), the view, the focal point or the like is changed for each of the characters based on the display control data obtained from the object display control unit 15.

Further, the screen generation unit 16 may move the position, the direction or the like of the image of the virtual space based on the various information (direction viewpoint, focal length or the like) obtained by the viewing direction measurement unit 13 and the focal length measurement unit 14. The image generated by the screen generation unit 16 is provided to each of the users by the respective HMD 21. With this, according to the first embodiment, when two or more players meet with other in the virtual space, the users can have communication by the movements of the heads or the eyes of each other, or by viewing so that the users can experience a more realistic world.

The control unit 17 controls the entire components of the data processing apparatus 10. The control unit 17 controls sending and receiving data between various devices by the communication unit 11, measurement of the viewing direction by the viewing direction measurement unit 13, measurement of the focal length by the focal length measurement unit 14, object display control by the object display control unit 15, generation of screens by the screen generation unit 16, and the like, for example. However, the contents to control are not limited so.

For example, the control unit 17 controls the start and end of performing a game process, a process at the user authentication, a process when an error is generated or the like.

Further, the control unit 17 may perform a process of log-in authentication for each of the users, and may perform the game, the display control process or the like for the user when the authentication succeeds.

Although the HMD 21 and the data processing apparatus 10 are separately configured in the above described embodiment, this is not limited so and the HMD 21 and the data processing apparatus 10 may be integrally configured in this embodiment. In such a case, each of the HMDs 21 corresponds to the data processing apparatus 10. Further, the controller 22 may not be provided in this embodiment.

(Example of Hardware Structure of Data Processing Apparatus 10)

Figure 2:
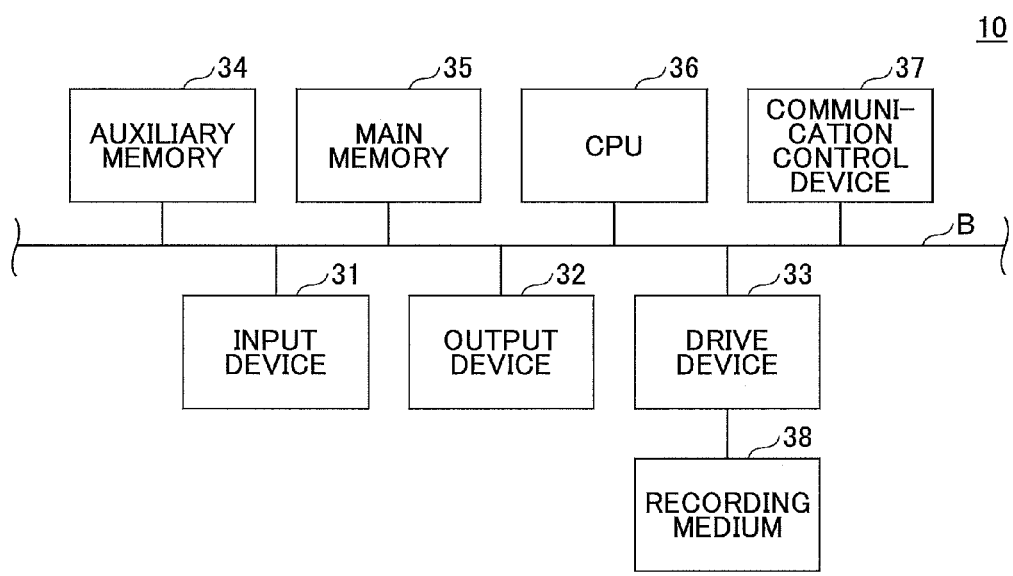
FIG. 2 is a block diagram illustrating an example of a hardware structure of the data processing apparatus of the first embodiment.

Next, an example of a hardware structure of the data processing apparatus 10 is described with reference to FIG. 2. FIG. 2 is a block diagram illustrating an example of a hardware structure of the data processing apparatus 10 of the first embodiment. In the example illustrated in FIG. 2, the data processing apparatus (computer) 10 includes an input device 31, an output device 32, a drive device 33, an auxiliary memory 34, a main memory 35, a CPU (Central Processing Unit) 36 and a communication control device 37, and these are connected with each other by a system bus B.

The input device 31 includes a pointing device operated by the user or the like such as a keyboard, a mouse or the like, and a sound input device such as a microphone or the like, for example. The input device 31 accepts inputs such as an instruction to execute the program, various operation data, data for activating software or the like, from the user or the like. The input device 31 may be an operation device such as the above described controller 22 or the like.

The output device 32 includes a display or the like for displaying various windows, data or the like that are necessary for operating the computer (data processing apparatus 10) in order to perform the processes of the embodiment. The output device 32 is capable of displaying an executed process, result or the like of a program by the control program included in the CPU 36. The output device 32 may be a data display device such as the above described HMD 21 or the like.

In this embodiment, the execution program installed in the computer is provided by a recording medium 38 or the like, for example. The recording medium 38 is capable of being set in the drive device 33. The execution program stored in the recording medium 38 is installed in the auxiliary memory 34 via the drive device 33 from the recording medium 38 based on a control signal from the CPU 36.

The auxiliary memory 34 is a storage unit or the like such as a HDD (Hard Disk Drive), a SSD (Solid State Drive) or the like, for example. The auxiliary memory 34 stores the execution program (display control program) of the embodiment, the control program provided in the computer or the like. The auxiliary memory 34 inputs and outputs the programs when necessary, based on a control signal from the CPU 36. The auxiliary memory 34 is capable of reading out necessary data from various information stored therein and writing data based on a control signal from the CPU 36 or the like.

The main memory 35 stores the execution program or the like read out from the auxiliary memory 34 by the CPU 36. The main memory 35 is a ROM (Read Only Memory), a RAM (Random Access Memory) or the like.

The CPU 36 actualizes each of the processes by controlling the processes of the entirety of the computer such as various calculations, input and output of data between each of the hardware structure units or the like, based on the control program such as OS (Operating System) or the like, and the execution program stored in the main memory 35. The various data or the like necessary for executing the programs may be obtained from the auxiliary memory 34 and the executed result or the like may be stored in the auxiliary memory 34.

Specifically, the CPU 36 executes processes corresponding to the program on the main memory 35 by executing the program installed in the auxiliary memory 34 based on an execution instruction or the like of the program obtained from the input device 31, for example. For example, the CPU 36 executes the processes such as sending and receiving data between various devices by the communication unit 11, measurement of the viewing direction by the viewing direction measurement unit 13, measurement of the focal length by the focal length measurement unit 14, object display control by the object display control unit 15, generation of screens by the screen generation unit 16, and the like, by executing the display control program. However the contents of the process by the CPU 36 are not limited so. The contents executed by the CPU 36 are stored in the auxiliary memory 34 or the like when necessary.

The communication control device 37 communicates with other external devices via the above described communication network. The communication control device 37 obtains an execution program, software, setting data and the like from the external device or the like by connecting to the communication network and the like, based on a control signal from the CPU 36. Further, the communication control device 37 may provide an executed result obtained by executing the program to the external device or the like, or provide the execution program of the embodiment itself to the external device or the like.

The recording medium 38 is a computer readable recording medium in which the execution program or the like is stored, as described above. The recording medium 38 is a semiconductor memory such as a flash memory or the like, a portable recording medium such as a CD-ROM, a DVD or the like, but not limited so.

By installing the execution program (a display control program or the like, for example) in the hardware structure illustrated in FIG. 2, various game processes, the display control process or the like can be actualized by the cooperation of the hardware resource and software. Further, by executing the game program installed in the recording medium 38, it is possible to display a game screen on the HMD 21, and the game can be performed by an operation by the user.

(Display Control Process of First Embodiment)

Next, the display control process of the first embodiment is described. FIG. 3 is a flowchart illustrating an example of the display control process of the first embodiment. In the example of FIG. 3, the communication unit 11 of the data processing apparatus 10 accepts an instruction to perform a game (S01). Next, the screen generation unit 16 displays a character to be operated by each of the users in a virtual space (S02).

Next, the data processing apparatus 10 obtains head motion data such as the position and the direction of the head of each of the users, and eye motion data such as the directions of the irises of each of the users from the HMD 21 (S03). Next, the viewing direction measurement unit 13 measures viewing direction in the virtual space based on the obtained head motion data and the eye motion data (S04). Further, the focal length measurement unit 14 measures focal length in the virtual space based the obtained head motion data and the eye motion data (S05). Either of the processes of S04 and S05 may be omitted, if necessary.

Next, the object display control unit 15 controls to adjust the view (direction of a face, focal length or the like) of each of the characters based on at least one of the measured viewing direction and focal length of the respective user (S06). Next, the screen generation unit 16 generates a screen by synthesizing the characters, each of which is adjusted by the process of S06, in the virtual space (S07), and displays the generated screen on the HMD 21 worn by each of the users (S08). By these processes, not only the direction or the focal length of the face of the character operated by the respective user, but also the direction or the focal length of the face of the character operated by the other user is reflected in the image for each of the users, and therefore, the user can grasp the views of the characters more realistically.

Next, the control unit 17 of the data processing apparatus 10 determines whether to finish the process (S09), and returns to the process of S03 when the process is not finished (NO of S09). Further, the control unit 17 finishes the process when it is determined to finish (YES of S09) based on the instruction by the user, the end of the game or the like.

As described above, according to the first embodiment, when two or more users (players) meet with each other in the virtual space, the players can have communication by the movements of the heads or the eyes of each other, or by viewing so that the users can experience a more realistic world.

(Example of Display Controlled Screen)

Figure 4A:
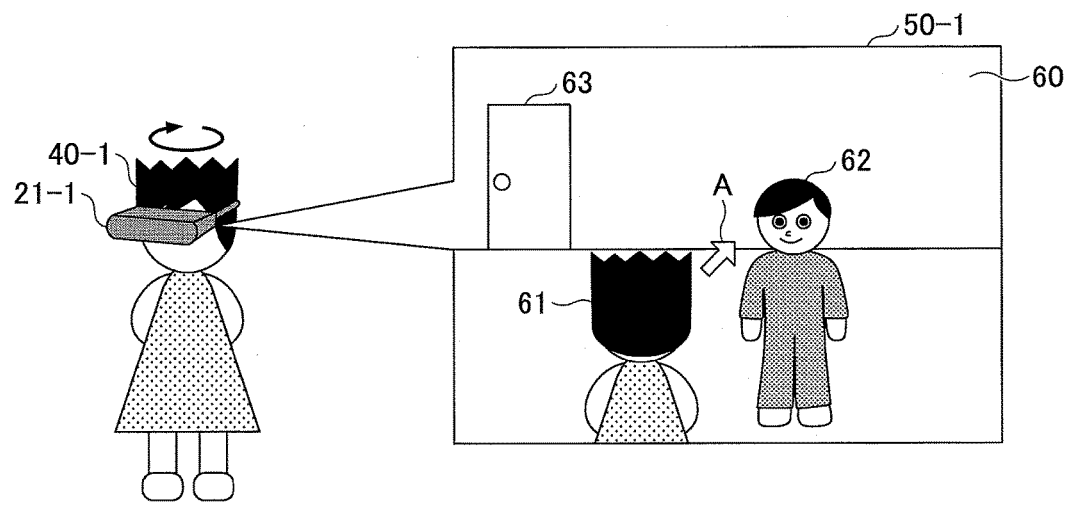
FIG. 4A and FIG. 4B are views schematically illustrating an example of a display controlled screen of the first embodiment.
Figure 4B:
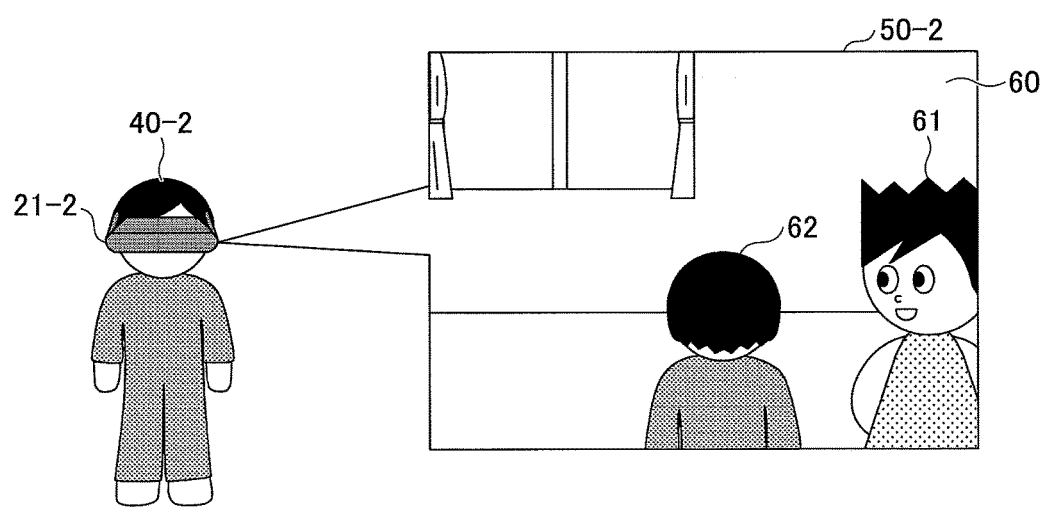

FIG. 4A and FIG. 4B are views illustrating an example of a display controlled screen of the first embodiment the display for which is controlled. For the example illustrated in FIG. 4A and FIG. 4B, two users 40-1 and 40-2 wear the HMDs 21-1 and 21-2, respectively. By performing the same game program, the same virtual spaces 60 exist in the screens 50-1 and 50-2 of the HMDs 21-1 and 21-2, respectively. A character (an example of an object) 61 operated by the user 40-1, and a character (an example of an object) 62 operated by the user 40-2 are displayed by being synthesized in each of the virtual spaces 60.

Here, as illustrated in FIG. 4A, the character 62 operated by another user (user 40-2) and an object 63 such as a door or the like are displayed in front of the character 61 operated by the user 40-1 in the first embodiment. In such a case, when the user 40-1 moves the head toward the character 62, the HMD 21 detects the direction of the head (head motion data), the direction of the eyes (irises) (eye motion data) or the like, and the head (view) of the character 61 is directed in a direction of an arrow "A".

With this, as illustrated in FIG. 4B, the user 40-2 can know that the other character 61 in the virtual space 60 in the screen 50-2 is facing toward the character 62 operated by the user 40-2 himself/herself. Thus, the user 40-2 can have various communications with the character 61 using a motion such as "facing with each other", "nodding", "talking to", "attacking", "escaping" or the like, or using a voice or the like.

Thus, according to the first embodiment, by causing the respective character to duplicate (follow) the direction of the face and the motion of the eyes of each of the users in the common virtual space, the users can have more realistic communication.

Further, by reflecting the viewing direction on the character, it is possible to grasp concentration of views from the users in a virtual space such as an art gallery, a museum or the like, and a popular work or the like can be grasped. Further, when seeing works in a group of two or more people, the users can enjoy as if they are actually in a museum.

Further, for a virtual space such as a watching seat of a sport, a watching seat of a fighting game, a grandstand of a live or the like, it is possible to know a player or the like at whom each of the users viewing from the view of the character or the like.

Further, according to the first embodiment, when characters meet with each other in a fighting game or the like, it is possible for the character to know what the opposing character is trying to do next by the view as the user can know the viewing direction of the other user, for example. For example, in the fighting game, a status in which a first user does not view an opposite character of a second user can be duplicated. In such a case, the second user can know that the first user does not view the character of the second user. Thus, it is possible for the second user to take a strategy of inducing carelessness of the first user.

Further, for a case in which an image is generated based on the viewpoint of the character in a FPS (First Person Shooting) game, a status in which the user is viewing another direction from a weapon held by the character can be expressed. For example, in multiplayer games, when a user views a second another character to attack next while attacking a first another character, the character operated by the user can pressurize another user operating the second other character. Further, the viewed user can clearly experience bodily sensation such as "I have seen (found)", and take a strategy such as "escaping" or "striking the opposite first".

Further, the characters can nod by vertically moving their necks or make eye contacts by grazing with each other in a team cooperative game or the like.

Further, by reflecting the information of distance (focal length) of an object for which the user is viewing, in addition to the direction of the face, when a plurality of characters are aligned beyond the view, it is possible to detect which character is a target that the user is viewing or the like, for example. Further, it is possible to detect that the user is looking at a scenery or an object beyond a wire netting or a window in a FPS (First Person Shooting) game or the like. When an object such as a mirror or the like exists in the virtual space, and another object is reflected in the mirror, if a difference between the focal length and a distance from the character to the mirror is greater than or equal to a previously set threshold, it is possible to detect that the user is looking at the object reflected in the mirror, not the mirror itself.

Second Embodiment

Next, the second embodiment is described. In the second embodiment, an example is described in which a plurality of the data processing apparatuses 10 access a server or the like via a communication network, and a virtual space provided by the server is shared by the plurality of data processing apparatuses 10 (so called simultaneous multiplayer games).
(Example of Functional Structure of Data Processing System)

Figure 5:
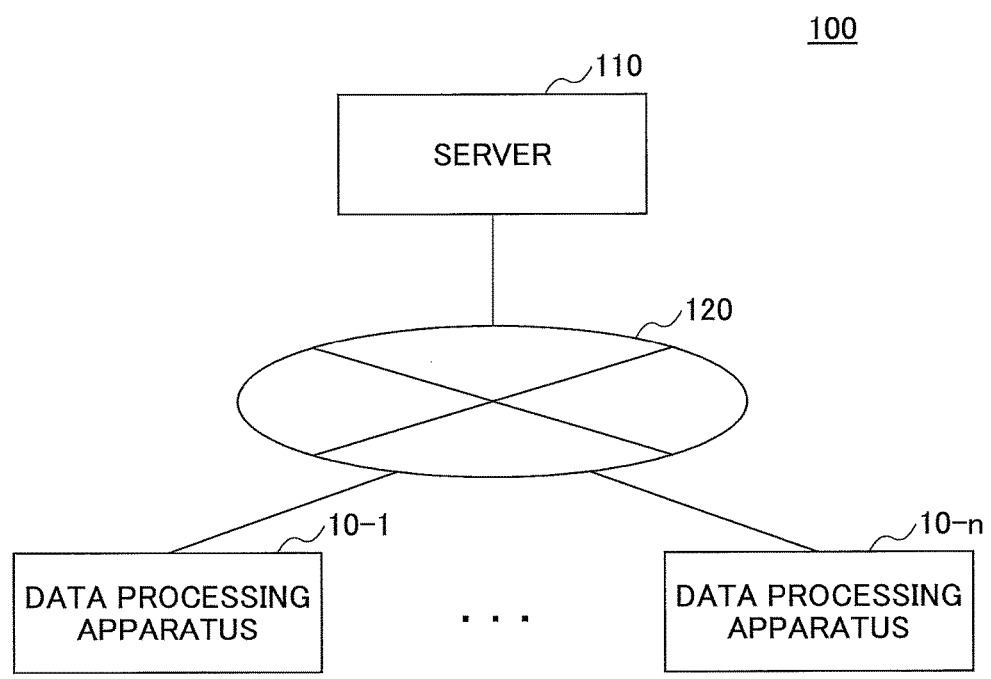
FIG. 5 is a block diagram illustrating an example of a functional structure of the data processing apparatus of a second embodiment.

FIG. 5 is a block diagram illustrating an example of a functional structure of a data processing system 100 of the second embodiment. The data processing system 100 illustrated in FIG. 5 includes a server 110 and one or more data processing apparatuses 10-1 to 10-n (hereinafter, simply referred to as a "data processing apparatus 10" as well). The server 110 and the data processing apparatuses 10 are connected with each other via the communication network 120, which is typically the INTERNET, LAN or the like, under a status that data are capable being sent and received.

The server 110 performs an authentication process for each of the one or more data processing apparatuses 10, and provides data for a virtual space based on the predetermined game program to the data processing apparatus 10 that is successfully authenticated. At this time, the server 110 synthesizes a character operated by the user who is successfully authenticated and a character operated by another user on the virtual space, and provides the synthesized image to the connected data processing apparatuses 10. The server 110 is a general PC, a server or the like, for example, but not limited so. For example, the server 110 may be a cloud server configured by a cloud computing including one or more data processing apparatuses, for example.

The data processing apparatus 10 has the similar structure as that of the data processing apparatus of the first embodiment, and the specific description is omitted here. The data processing apparatus 10 displays the virtual space and the motion or the like of the character to be operated obtained from the server 110 in the screen of the HMD 21 for the user who wears the HMD 21 and operates the controller 22.
(Example of Functional Structure of Server 110)

Figure 6:
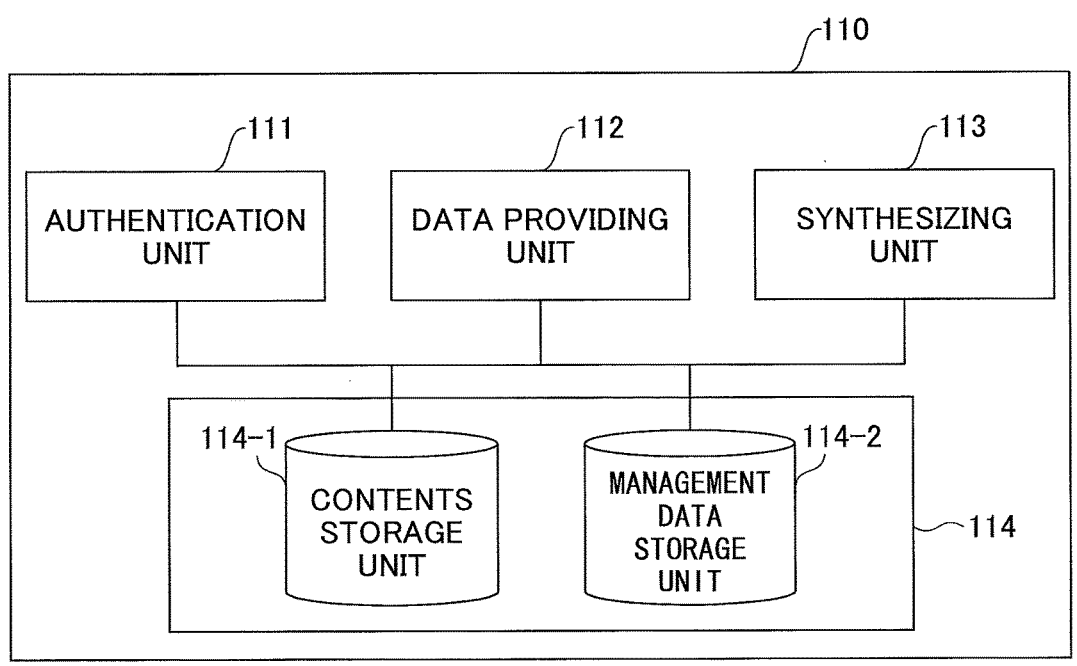
FIG. 6 is a block diagram illustrating an example of a functional structure of a server of the second embodiment.

An example of a functional structure of the server 110 is described with reference to FIG. 6. FIG. 6 is a block diagram illustrating an example of a functional structure of the server 110 of the second embodiment. In the example of FIG. 6, the server 110 includes an authentication unit 111, a data providing unit 112, a synthesizing unit 113 and a storage unit 114. The storage unit 114 includes a contents storage unit 114-1 and a management data storage unit 114-2. However, data stored in the storage unit 114 are not limited so.

The authentication unit 111 performs a user authentication for the data processing apparatus 10 that accesses via the communication network 120. The authentication unit 111 compares user data input from the data processing apparatus 10 with previously set user data (user ID, password, for example). Then, when there is the user data that matches the input user data, the authentication unit 111 allows the access (game execution or the like, for example) thereafter. On the other hand, when there is no user data that matches the input user data, the authentication unit 111 outputs a message indicating the fact to the data processing apparatus 10. The authentication unit 111 may output data promoting to newly register as a user to the data processing apparatus 10, and output data to promote input of the user data to the data processing apparatus 10 again.

The data providing unit 112 provides data for a virtual space in which the users using the data processing apparatuses 10 that are successfully authenticated by the authentication unit 11 communicate with each other. The data for a virtual space is data that is generated to correspond to the game program designated by the user, among the one or more game programs stored in the contents storage unit 114-1. The data for a virtual space is data for displaying the above described virtual space in the screen of the HMD 21. The data providing unit 112 performs the user authentication or the like first, and provides the data for a virtual space to only the user (data processing apparatus 10) who is successfully authenticated. The management data storage unit 114-2 stores data for managing the users to whom the same (common) virtual space is provided, log data for each of the users, and the like. The data providing unit 112 provides the synchronized virtual space in accordance with the log in status to the same game of each of the users at the moment.

The synthesizing unit 113 synthesizes the characters operated by the users, respectively, in the virtual space provided by the data providing unit 112. At this time, the synthesizing unit 113 changes the view of the character (the position, the direction of the face), the focal point or the like of each of the characters based on the viewing direction, the focal length or the like of the respective user obtained from the data processing apparatuses 10, respectively.

The synthesizing unit 113 sends the synthesized image to each of the data processing apparatuses 10 to cause the HMD 21 worn by each of the users to display the synthesized image.

A hardware structure of each of the server 110 and the data processing apparatus 10 of the second embodiment is the same as that illustrated in FIG. 2, and the description is omitted here. Further, by installing the execution program (a display control program or the like, for example) in the hardware structure of the server 110 or the data processing apparatus 10 of the second embodiment as well, various game processes, the display control process or the like can be actualized by the cooperation of the hardware resource and software.

(Display Control Process of Second Embodiment)

Next, the display control process of the second embodiment is described. The display control process of the second embodiment includes processes of the data processing apparatus 10 and processes of the server 110, and the processes are separately described hereinafter.

(Process of Data Processing Apparatus 10)

Figure 7:
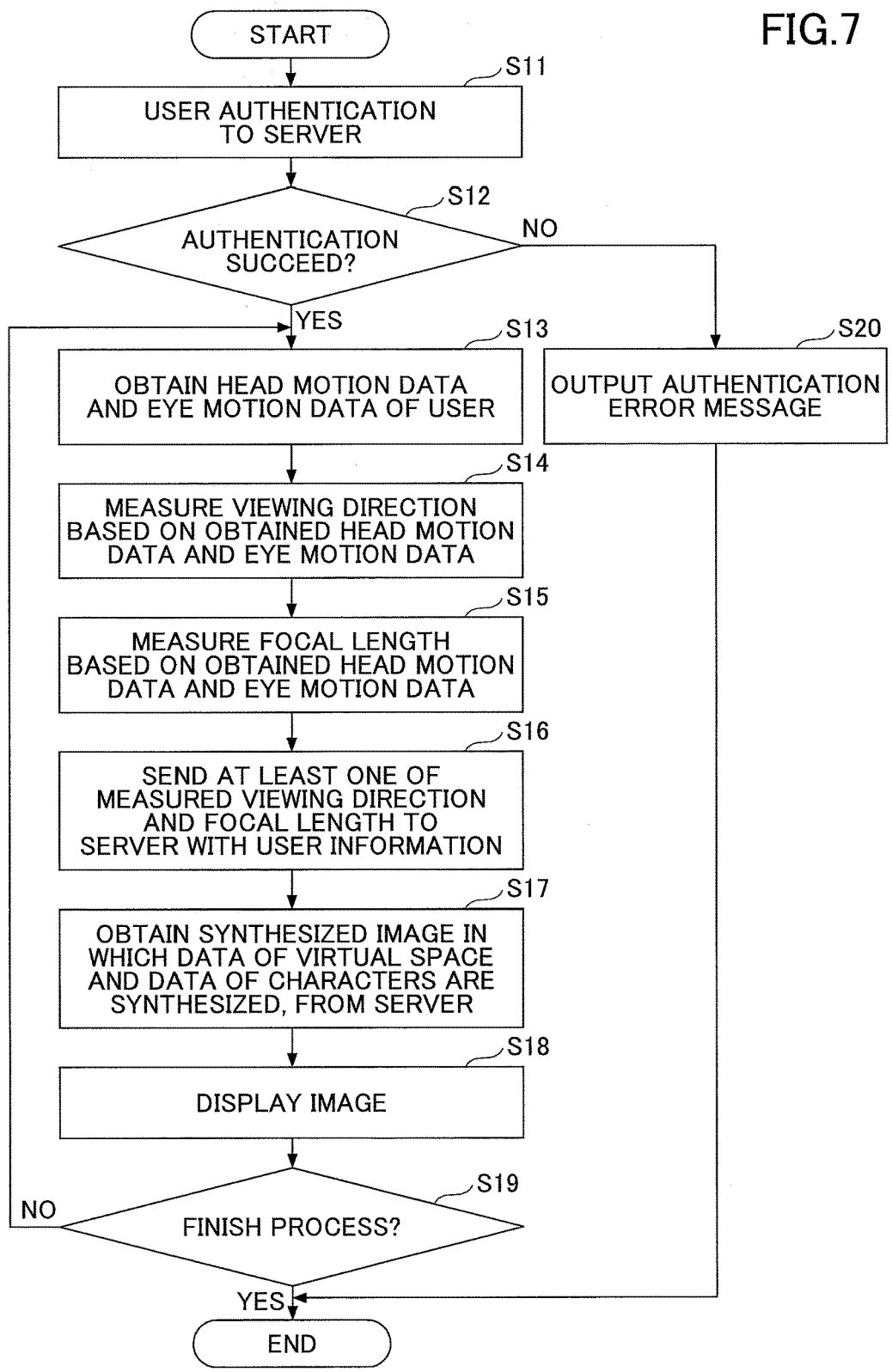
FIG. 7 is a flowchart illustrating an example of the display control process of the data processing apparatus of the second embodiment.

FIG. 7 is a flowchart illustrating an example of the display control process of the data processing apparatus of the second embodiment. In the example of FIG. 7, the data processing apparatus 10 requests a user authentication to the server 110 (S11). Then, the control unit 17 determines whether the authentication is succeeded (S12), and when the authentication is succeeded (YES of S12), processes of S13 to S19, which will be described later, are performed.

Specifically, the data processing apparatus 10 obtains the head motion data and the eye motion data of the user from the HMD 21 (S13). Then, the viewing direction measurement unit 13 measures the viewing direction based on the obtained head motion data and the eye motion data (S14). Further, the focal length measurement unit 14 measures the focal length in the virtual space based on the obtained head motion data and the eye motion data (S15). Either of the processes of S14 and S15 may be omitted, if necessary.

Next, the communication unit 11 sends at least one of the measured viewing direction and the focal length to the server 110 in association with the user data (S16). Further, the communication unit 11 obtains a synthesized image in which the data for a virtual space, the character operated by the user and the character operated by the other user are synthesized from the server 110 (S17). Further, the screen generation unit 16 displays the obtained image in the screen of the HMD (S18).

The control unit 17 determines whether to finish the process (S19), and returns to the process of S13 when the process is not finished (NO of S19). Further, the control unit 17 finishes the process when it is determined to finish (YES of S19), based on the instruction by the user, the end of the game or the like. Further, when the authentication is not succeeded in the process of S12 (NO of S12), the control unit 17 outputs an authentication error message in the screen or the like (S20), and finishes the process.

(Process of Server 110)

Figure 8:
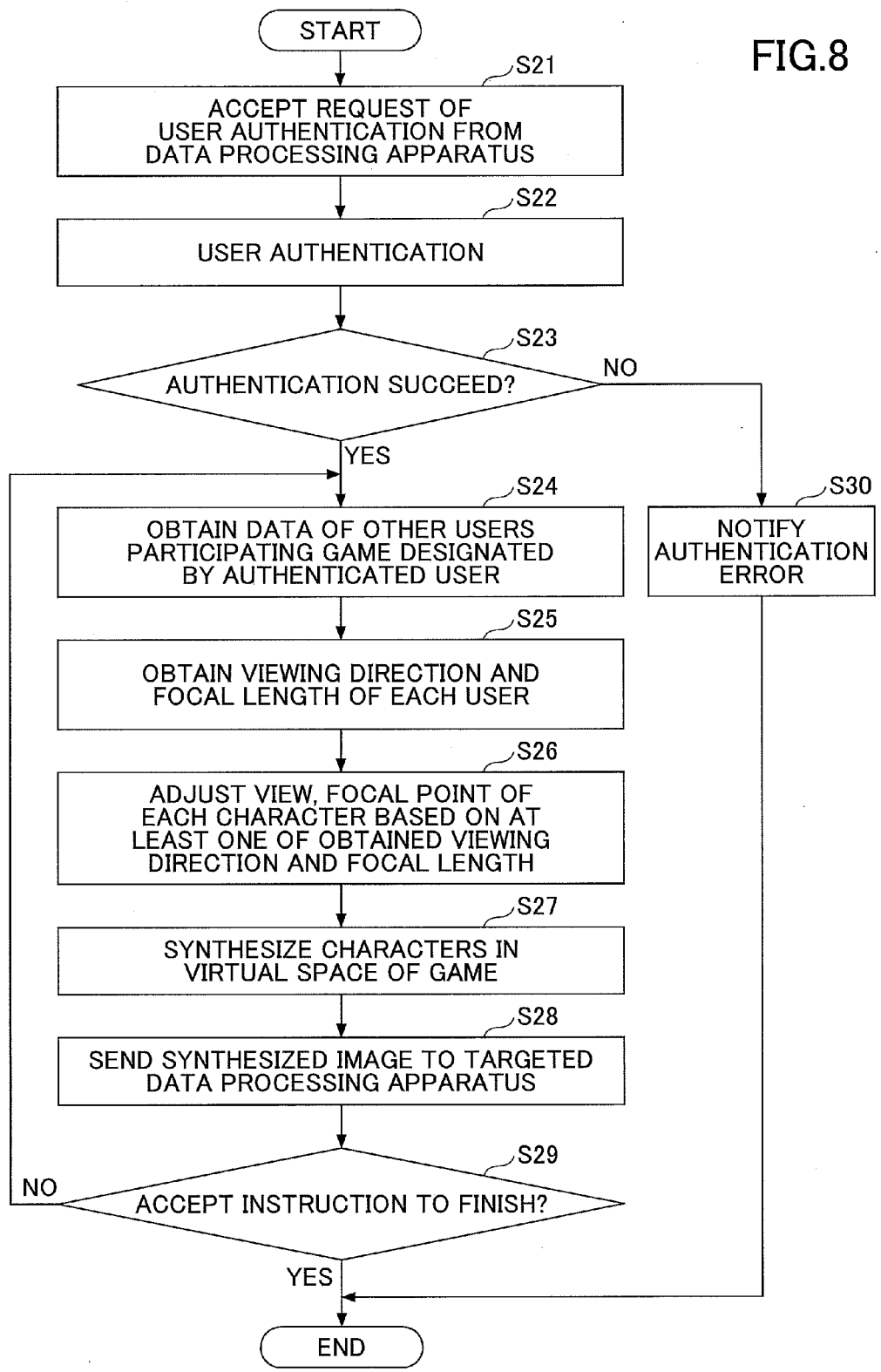
FIG. 8 is a flowchart illustrating an example of the display control process of the server of the second embodiment.

Next, the display control process of the server 110 is described with reference to FIG. 8. FIG. 8 is a flowchart illustrating an example of the display control process of the server of the second embodiment. In the example of FIG. 8, the authentication unit 111 of the server 110 accepts the request of the user authentication from the data processing apparatus 10 (S21), and preforms the user authentication (S22). In the process of S22, the authentication unit 111 compares the user data input from the data processing apparatus 10 with the previously set user data (user ID, password, for example). Then, when there is the user data that matches the input user data, the authentication unit 111 determines that the authentication is succeeded, and when there is no user data that matches the input user data, the authentication unit 111 determines that the authentication is failed. The authentication unit 111 determines whether the authentication is succeeded or not (S23), and when the authentication is succeeded (YES of S23), processes of S24 to S28, which will be explained later, are performed.

Specifically, the data providing unit 112 obtains data of other users who participate in the game designated by the authenticated user (S24), and obtains the viewing direction and the focal length of each of the obtained users (S25). In the process of S25, only one of the viewing direction and the focal length may be obtained. Next, the data providing unit 112 adjusts the view and the focal point of the character operated by each of the users based on the obtained viewing direction and the focal length, for example (S26). Next, the synthesizing unit 113 synthesizes each of the characters in the virtual space of the game (S27), and sends the synthesized image to the targeted data processing apparatus (S28).

The data providing unit 112 determines whether to accept an instruction to finish the game or the like from the user (S29), and returns to the process of S24 when the instruction to finish is not accepted (NO of S29). Further, when the instruction to finish is accepted in the process of S23 (YES of S29), the data providing unit 112 finishes the process. Further, when the authentication is failed in the process of S23 (NO of S23), the authentication unit 111 notifies an authentication error to the data processing apparatus 10 (S30), and finishes the process.

As described above, according to the second embodiment, when two or more users (players) meet in the virtual space in an on-line system such as a server-client system (the server 110 and the data processing apparatus 10) or the like, the users can have communication by the movements of the heads or the views of each other. Thus, each of the users can experience a more realistic world.

According to the embodiment, a motion of a character in a virtual space is appropriately controlled in accordance with an actual motion of a user. According to the embodiment, the motion of the head or the eyes of each of the users obtained from at least one of the viewing direction and the focal length of the respective user is linked to the motion of the head or the eyes of the character (operated by the respective user or the like) of the game displayed in the screen. Further, in this embodiment, the motion of the head or the eyes of the character operated by the other user participating in the same game is linked to the motion of the head or the eyes of the character of the other user to be displayed in the screen. Thus, in this embodiment, it is possible for a user to easily communicate with others by showing the motion of himself/herself to the others in a virtual space. Thus, the user can experience a more realistic world.

Further, according to the embodiment, when two characters view with each other in a virtual space, various effects may be expressed such as displaying an image, a drawing pattern or the like in which a heart shape exists (when the characters are a man and a woman, for example), a spark flies (when the characters are the same sex, or are rivals, for example). Further, according to the embodiment, an effect such as an object such as a building, a monster or the like that is beyond the view is highlighted can be performed so that the viewed object can be shared by the other players. Here, in this embodiment, the character of the user himself/herself or the character of the other user may not be displayed on the screen of the data display device.

Although a preferred embodiment of the data processing apparatus and the method of controlling display has been specifically illustrated and described, it is to be understood that minor modifications may be made therein without departing from the spirit and scope of the invention as defined by the claims.

The present invention is not limited to the specifically disclosed embodiments, and numerous variations and modifications may be made without departing from the spirit and scope of the present invention. Further, a part of or the entirety of the above described first to third examples may be combined.

The above described embodiment may be applied to various games such as a racing game, a shooting game, a fighting game, a flight simulator, a dating simulation game and the like. Further, the image control of the embodiment may be applied to application (program) that does not belong to a category of the game.

The above embodiment can be applied to a non-transitory computer-readable recording medium having recorded thereon a program that causes a computer to execute a method of controlling display for a data processing apparatus that controls a screen displayed by a body-mounted data display device. The method includes measuring a viewing direction or a focal length of a user, based on a motion data of a head and eyes of the user who wears the data display device, controlling a viewing direction or a focal length of an object that moves in a virtual space displayed in the screen by an operation of the user to correspond to the viewing direction or the focal length of the user obtained in the measuring, respectively; and generating a screen, in which the motion of the object obtained in the displaying is displayed, that is displayed by the data display device.

In the above described method, in the measuring, the viewing direction of the user may be measured, and wherein in the controlling, the viewing direction of the object may be controlled to correspond to the viewing direction obtained in the measuring.

What is claimed is:

1. A data processing apparatus that controls a screen displayed by a body-mounted data display device, comprising:
    a processor; and
    a memory storing instructions that, when executed, cause the processor to perform processes of
        measuring a viewing direction and a focal length of a user, based on a motion data of a head and eyes of the user who wears the data display device,
        controlling a viewing direction and a focal length of an object that moves in a virtual space displayed in the screen by an operation of the user to correspond to the viewing direction and the focal length of the user obtained in the measuring, respectively, and
        generating a content to be displayed in a screen, in which the motion of the object obtained in the controlling is displayed, that is displayed by the data display device.

2. The data processing apparatus according to claim 1, wherein the instructions stored in the memory, when executed, cause the processor to further perform a process of receiving the motion data of the eyes of the user who wears the data display device from an inward direction camera provided in the data display device.

3. The data processing apparatus according to claim 1, wherein in the measuring, the focal length of the user is a distance from a viewpoint of the user to an object beyond the user's view in a virtual space displayed in the screen.

4. The data processing apparatus according to claim 1,
    wherein the instructions stored in the memory, when executed, cause the processor to further perform a process of receiving the motion data of the eyes of the user who wears the data display device from an inward direction camera provided in the data display device, the motion data of the eyes of the user including a viewpoint of the user detected from the position and the direction of the eyes of the user, and
    wherein the focal length of the user is a distance from the viewpoint of the user to an object beyond the user's view in a virtual space displayed in the screen.

5. A data processing apparatus, connected to a server via a communication network, that controls a screen displayed by a body-mounted data display device, comprising:
    a processor; and
    a memory storing instructions that, when executed, cause the processor to perform processes of
        measuring a viewing direction and a focal length of a user, based on a motion data of a head and eyes of the user who wears the data display device,
        sending information regarding the viewing direction and the focal length obtained in the measuring to the server; and obtaining a synthesized image in which a predetermined virtual space and an object that moves by an operation by the user are synthesized from the server, and
        displaying the obtained synthesized image in the screen,
    wherein a viewing direction and a focal length of the object are controlled in accordance with the viewing direction and the focal length of the user obtained in the measuring, respectively.

6. The data processing apparatus according to claim 5, wherein the instructions stored in the memory, when executed, cause the processor to further perform a process of receiving the motion data of the eyes of the user who wears the data display device from an inward direction camera provided in the data display device.

7. The data processing apparatus according to claim 5, wherein in the measuring, the focal length of the user is a distance from a viewpoint of the user to an object beyond the user's view in a virtual space displayed in the screen.

8. The data processing apparatus according to claim 5,
    wherein the instructions stored in the memory, when executed, cause the processor to further perform a process of receiving the motion data of the eyes of the user who wears the data display device from an inward direction camera provided in the data display device, the motion data of the eyes of the user including a viewpoint of the user detected from the position and the direction of the eyes of the user, and
    wherein the focal length of the user is a distance from the viewpoint of the user to an object beyond the user's view in a virtual space displayed in the screen.

9. A method of controlling display for a data processing apparatus that controls a screen displayed by a body-mounted data display device, comprising:
    measuring a viewing direction and a focal length of a user, based on a motion data of a head and eyes of the user who wears the data display device,
    controlling a viewing direction and a focal length of an object that moves in a virtual space displayed in the screen by an operation of the user to correspond to the viewing direction and the focal length of the user obtained in the measuring, respectively; and generating a screen, in which the motion of the object obtained in the controlling is displayed, that is displayed by the data display device.

10. The method of controlling according to claim 9, further comprising: receiving the motion data of the eyes of the user who wears the data display device from an inward direction camera provided in the data display device.

11. The method of controlling according to claim 9, wherein in the measuring, the focal length of the user is a distance from a viewpoint of the user to an object beyond the user's view in a virtual space displayed in the screen.

12. The method of controlling according to claim 9, further comprising: receiving the motion data of the eyes of the user who wears the data display device from an inward direction camera provided in the data display device, the motion data of the eyes of the user including a viewpoint of the user detected from the position and the direction of the eyes of the user, and wherein the focal length of the user is a distance from the viewpoint of the user to an object beyond the user's view in a virtual space displayed in the screen.

* * * * *